(12) United States Patent
Ilse et al.

(10) Patent No.: US 10,598,506 B2
(45) Date of Patent: Mar. 24, 2020

(54) AUDIO NAVIGATION USING SHORT RANGE BILATERAL EARPIECES

(71) Applicant: BRAGI GmbH, München (DE)

(72) Inventors: Maximilian Ilse, München (DE); Peter Vincent Boesen, München (DE)

(73) Assignee: BRAGI GmbH, München (DE)

( * ) Notice: Subject to any disclaimer, the term of this patent is extended or adjusted under 35 U.S.C. 154(b) by 22 days.

(21) Appl. No.: 15/702,671

(22) Filed: Sep. 12, 2017

(65) Prior Publication Data

US 2018/0073886 A1   Mar. 15, 2018

Related U.S. Application Data

(60) Provisional application No. 62/393,433, filed on Sep. 12, 2016.

(51) Int. Cl.
*G01C 21/36*     (2006.01)
*H04S 7/00*      (2006.01)
(Continued)

(52) U.S. Cl.
CPC ..... *G01C 21/3629* (2013.01); *G01C 21/3644* (2013.01); *H04R 1/32* (2013.01);
(Continued)

(58) Field of Classification Search
CPC .. G01C 21/3629; G01C 21/3644; H04R 1/32; H04R 1/1016; H04R 29/001; H04S 7/30;
(Continued)

(56) References Cited

U.S. PATENT DOCUMENTS 2,325,590 A    8/1943   Carlisle et al.
2,430,229 A    11/1947  Kelsey
(Continued)

FOREIGN PATENT DOCUMENTS

CN    204244472 U    4/2015
CN    104683519 A    6/2015
(Continued)

OTHER PUBLICATIONS

Valimaki et al., Assisted Listening Using a Headset, 2015, IEEE, p. 92-99 (Year: 2015).*
(Continued)

*Primary Examiner* — McDieunel Marc
(74) *Attorney, Agent, or Firm* — Goodhue, Coleman & Owens, P.C.

(57) ABSTRACT

A method for providing binaural audio navigation with a set of earpieces including a left earpiece and a right earpiece is provided. The method includes obtaining a generalized position of a user of the set of the earpieces, obtaining a destination for the user of the set of the earpieces, sensing head orientation and movement with inertial sensors of the set of earpieces, applying a binaural synthesis algorithm using the generalized position, a destination, head orientation and movement to create a plurality of virtual sound sources, and transducing binaural audio based on the virtual sound sources at speakers within the set of the earpieces in order to provide binaural audio navigation to the user. The plurality of virtual sound sources may include a main virtual sound source providing a continuous audio cue. The plurality of virtual sources may include auditory landmark cues.

10 Claims, 3 Drawing Sheets

(51) Int. Cl.
*H04R 1/32* (2006.01)
*H04R 1/10* (2006.01)

(52) U.S. Cl.
CPC ............... *H04S 7/30* (2013.01); *H04S 7/304* (2013.01); *H04R 1/1016* (2013.01); *H04S 2400/11* (2013.01)

(58) Field of Classification Search
CPC .... H04S 7/304; H04S 2400/11; H04W 76/14; H04W 52/0206; H04B 1/385; G06F 3/013

See application file for complete search history.

(56) References Cited

U.S. PATENT DOCUMENTS

| | | |
|---|---|---|
| 3,047,089 A | 7/1962 | Zwislocki |
| D208,784 S | 10/1967 | Sanzone |
| 3,586,794 A | 6/1971 | Michaelis |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A * | 2/1998 | Anderson .............. H04B 1/385 381/312 |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,230,029 B1 | 5/2001 | Yegiazaryan et al. |
| 6,243,476 B1 * | 6/2001 | Gardner .................. H04S 1/007 381/1 |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| D601,134 S | 9/2009 | Elabidi et al. |
| 7,825,626 B2 | 11/2010 | Kozisek |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Müllenborn et al. |
| 8,374,365 B2 * | 2/2013 | Goodwin ................ H04S 1/002 381/17 |
| 8,406,448 B2 | 3/2013 | Lin |
| 8,436,780 B2 | 5/2013 | Schantz et al. |
| D687,021 S | 7/2013 | Yuen |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| 9,584,915 B2 * | 2/2017 | Fullam ................ G06K 9/0057 |
| D788,079 S | 5/2017 | Son et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |

(56) References Cited

U.S. PATENT DOCUMENTS

| | | |
|---|---|---|
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0198542 A1* | 9/2006 | Benjelloun Touimi ................... H04S 3/008 381/307 |
| 2006/0220915 A1 | 10/2006 | Bauer |
| 2006/0258412 A1 | 11/2006 | Liu |
| 2008/0076972 A1 | 3/2008 | Dorogusker et al. |
| 2008/0090622 A1 | 4/2008 | Kim et al. |
| 2008/0146890 A1 | 6/2008 | LeBoeuf et al. |
| 2008/0254780 A1 | 10/2008 | Kuhl et al. |
| 2008/0255430 A1 | 10/2008 | Alexandersson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0191920 A1 | 7/2009 | Regen et al. |
| 2009/0245559 A1 | 10/2009 | Boltyenkov et al. |
| 2009/0252356 A1* | 10/2009 | Goodwin ............ G10L 19/173 381/310 |
| 2009/0261114 A1 | 10/2009 | McGuire et al. |
| 2009/0296968 A1 | 12/2009 | Wu et al. |
| 2010/0033313 A1 | 2/2010 | Keady et al. |
| 2010/0203831 A1 | 8/2010 | Muth |
| 2010/0210212 A1 | 8/2010 | Sato |
| 2010/0320961 A1 | 12/2010 | Castillo et al. |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2012/0057740 A1 | 3/2012 | Rosal |
| 2013/0127980 A1* | 5/2013 | Haddick ................ G06F 3/013 348/14.08 |
| 2013/0278631 A1* | 10/2013 | Border ................ G02B 27/017 345/633 |
| 2013/0316642 A1* | 11/2013 | Newham .......... H04W 52/0206 455/11.1 |
| 2013/0346168 A1 | 12/2013 | Zhou et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0110587 A1 | 4/2015 | Hori |
| 2015/0148989 A1 | 5/2015 | Cooper et al. |
| 2015/0245127 A1 | 8/2015 | Shaffer |
| 2016/0033280 A1 | 2/2016 | Moore et al. |
| 2016/0072558 A1 | 3/2016 | Hirsch et al. |
| 2016/0073189 A1 | 3/2016 | Lindén et al. |
| 2016/0125892 A1 | 5/2016 | Bowen et al. |
| 2016/0360350 A1 | 12/2016 | Watson et al. |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1* | 4/2017 | Boesen ................ H04W 76/14 |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1* | 6/2017 | Perianu ................ H04R 29/001 |
| 2017/0188127 A1* | 6/2017 | Perianu ................ H04R 1/1016 |
| 2017/0188132 A1 | 6/2017 | Hirsch et al. |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0257698 A1 | 9/2017 | Boesen et al. |
| 2018/0012228 A1* | 1/2018 | Milevski .......... G06Q 20/40145 |
| 2018/0014102 A1* | 1/2018 | Hirsch ................ H04R 1/1016 |
| 2018/0040093 A1* | 2/2018 | Boesen ................ G01C 21/16 |
| 2018/0060031 A1* | 3/2018 | Boesen ................ G06F 3/167 |
| 2018/0117469 A1* | 5/2018 | Ilse ........................ A63F 13/54 |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |
| GB | 2508226 A | 5/2014 |
| WO | 2008103925 A1 | 8/2008 |
| WO | 2007034371 A3 | 11/2008 |
| WO | 2011001433 A2 | 1/2011 |

(56) References Cited

FOREIGN PATENT DOCUMENTS

| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |

OTHER PUBLICATIONS

Algazi et al., Immersive spatial sound for mobile multimedia, 2005, IEEE, p. 1-8 (Year: 2005).*
Zhou et al., The Role of 3-D Sound in Human Reaction and Performance in Augmented Reality Environment, 2007, IEEE, p. 262-272 (Year: 2007).*
Lezzoum et al., Assessment of sound source localization of an intra-aural audio wearable device for audio augmented reality applications, 2016, IEEE, p. 1-6 (Year: 2016).*
Akkermans, "Acoustic Ear Recognition for Person Identification", Automatic Identification Advanced Technologies, 2005 pp. 219-223.
Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected-The personalized digital assistant", "http://bmwblog.com/2016/01/05/bmw-introduces-bmw-connected-the-personalized-digital-assistant", (Jan. 5, 2016).
BRAGI Is On Facebook (2014).
BRAGI Update—Arrival Of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready To Rumble, A Lot To Be Done Over Christmas (Dec. 22, 2014).
BRAGI Update—Memories From April—Update On Progress (Sep. 16, 2014).
BRAGI Update—Memories from May—Update On Progress—Sweet (Oct. 13, 2014).
BRAGI Update—Memories From One Month Before Kickstarter—Update On Progress (Jul. 10, 2014).
BRAGI Update—Memories From The First Month of Kickstarter—Update on Progress (Aug. 1, 2014).
BRAGI Update—Memories From The Second Month of Kickstarter—Update On Progress (Aug. 22, 2014).
BRAGI Update—New People @BRAGI—Prototypes (Jun. 26, 2014).
BRAGI Update—Office Tour, Tour To China, Tour to CES (Dec. 11, 2014).
BRAGI Update—Status On Wireless, Bits and Pieces, Testing-Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back To China, Backer Day, On Track(May 16, 2015).
BRAGI Update—Beta2 Production and Factory Line(Aug. 20, 2015).
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2015).
BRAGI Update—On Track, Design Verification, How It Works and What's Next(Jul. 15, 2015).
BRAGI Update—Status On Wireless, Supply, Timeline and Open House@BRAGI(Apr. 1, 2015).
BRAGI Update—Unpacking Video, Reviews On Audio Perform and Boy Are We Getting Close(Sep. 10, 2015).
Healthcare Risk Management Review, "Nuance updates computer-assisted physician documentation solution" (Oct. 20, 2016).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces A Health + Mobility Concept For Wellness In Mobility", Fountain Valley, California (2017).
International Search Report & Written Opinion, PCT/EP2016/070231 (dated Nov. 18, 2016).
Last Push Before The Kickstarter Campaign Ends on Monday 4pm CET (Mar. 28, 2014).
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for The Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).

* cited by examiner

AUDIO NAVIGATION USING SHORT RANGE BILATERAL EARPIECES

PRIORITY STATEMENT

This application claims priority to U.S. Provisional Application 62/393,433, filed on Sep. 12, 2016, and entitled "Binaural Audio Navigation Using Short Range Wireless Transmission from Bilateral Earpieces to Receptor Device System and Method", hereby incorporated by reference in its entirety.

FIELD OF THE INVENTION

The present invention relates to wearable devices. More particularly, but not exclusively, the present invention relates to ear pieces.

BACKGROUND

Visual navigation systems have many attendant risks for users who need to reach unknown or unfamiliar destinations. First, users who rely on a visual navigation system, whether electronic or print, while traveling are at greater than normal risk of involvement in an accident, which may cause property damage, personal damage, or possibly the loss of life. Second, people using visual navigation systems may have difficulties due to the fact that their attention is divided between two or more tasks.

In addition, in other current navigation systems users hold or otherwise support devices and thus the user is not handsfree. This may further add to the difficulty in successful interacting with the navigation system in an effective and time-efficient manner. What is needed are improved methods and systems for seamless interaction to assist users in navigating to their intended destinations.

SUMMARY

Therefore, it is a primary object, feature, or advantage of the present invention to improve over the state of the art.

It is a further object, feature, or advantage to provide three dimensional spatial location of a user.

It is a still further object, feature, or advantage to provide the ability to guide the user to destination points without having to use speech cues.

It is another object, feature, or advantage to provide the enhanced ability to guide visually impaired individuals with three dimensional sound.

It is yet another object, feature, or advantage to transmit three dimensional cues to a user.

A further object, feature, or advantage is to provide enhanced localization of the individual to the environment.

A still further object, feature, or advantage is to provide enhanced speed of guidance cues from the navigation system to the user.

One or more of these and/or other objects, features, or advantages of the present invention will become apparent from the specification and claims that follow. It is to be understood that different embodiments may have different objects, features, and advantages. Therefore, the present invention is not to be limited by or to these objects, features, or advantages.

According to one aspect, a method for providing binaural audio navigation with a set of earpieces including a left earpiece and a right earpiece is provided. The method includes obtaining a generalized position of a user of the set of the earpieces, obtaining a destination for the user of the set of the earpieces, sensing head orientation and movement with inertial sensors of the set of earpieces, applying a binaural synthesis algorithm using the generalized position, a destination, head orientation and movement to create a plurality of virtual sound sources, and transducing binaural audio based on the virtual sound sources at speakers within the set of the earpieces in order to provide binaural audio navigation to the user. The plurality of virtual sound sources may include a main virtual sound source providing a continuous audio cue. The plurality of virtual sources may include auditory landmark cues. The generalized position of the user of the set of the earpiece may be a GPS location. The binaural synthesis algorithm may be performed using a processor of at least one of the left earpiece and the right earpiece. The plurality of virtual sound sources may further include a continuous virtual source indicative of a compass direction such as a magnetic north pole direction.

According to another aspect, a, method for providing binaural audio navigation with a set of earpieces including a left earpiece and a right earpiece includes steps of obtaining a generalized position of a user of the set of the earpieces, obtaining a destination for the user of the set of the earpieces, sensing head orientation and movement with inertial sensors of the set of earpieces, applying a binaural synthesis algorithm using the generalized position, a destination, head orientation and movement to create a plurality of virtual sound sources, and transducing binaural audio based on the virtual sound sources at speakers within the set of the earpieces in order to provide binaural audio navigation to the user, wherein the plurality of virtual sound sources include a main virtual sound source providing a continuous audio cue. The method may further include determining that the user has arrived at the destination and turning off the main virtual sound source providing the continuous audio cue.

DETAILED DESCRIPTION

The present invention provides for binaural audio navigation where auditory cues are used. In contrast to a navigation application for a hand-held device (e.g. a smart phone), the advantage of using auditory cues is that the user has free hands and vision. Especially in traffic, visual navigation is risky and can lead to serious accidents whether driving a car, riding a bike or walking. In addition, conventional hand-held devices are incapable of displaying the unique cues provided through three dimensional inertial sensors (e.g. magnetometers, gyrometers, and accelerometers) positioned on the user's head to give accurate and specific data as to the three dimensional location of the user. Thus, a person will not be confused by the almost random position of the handset in terms of positional and destination calculations. This provides a new and improved access to critical navigation data.

Furthermore, binaural technology (in contrast to "stereo" playback whereby the user is presented with a generalized sound in both ears) is capable of 'displaying' virtual sound sources at a certain position (azimuth, elevation) and distance from the user's head. Thus, the present invention may be used to create an augmented reality and need not fully replace visual information (however this can be suitable for the visually impaired) since audiovisual navigation may be superior to visual-only or audio-only navigation.

Figure 1:
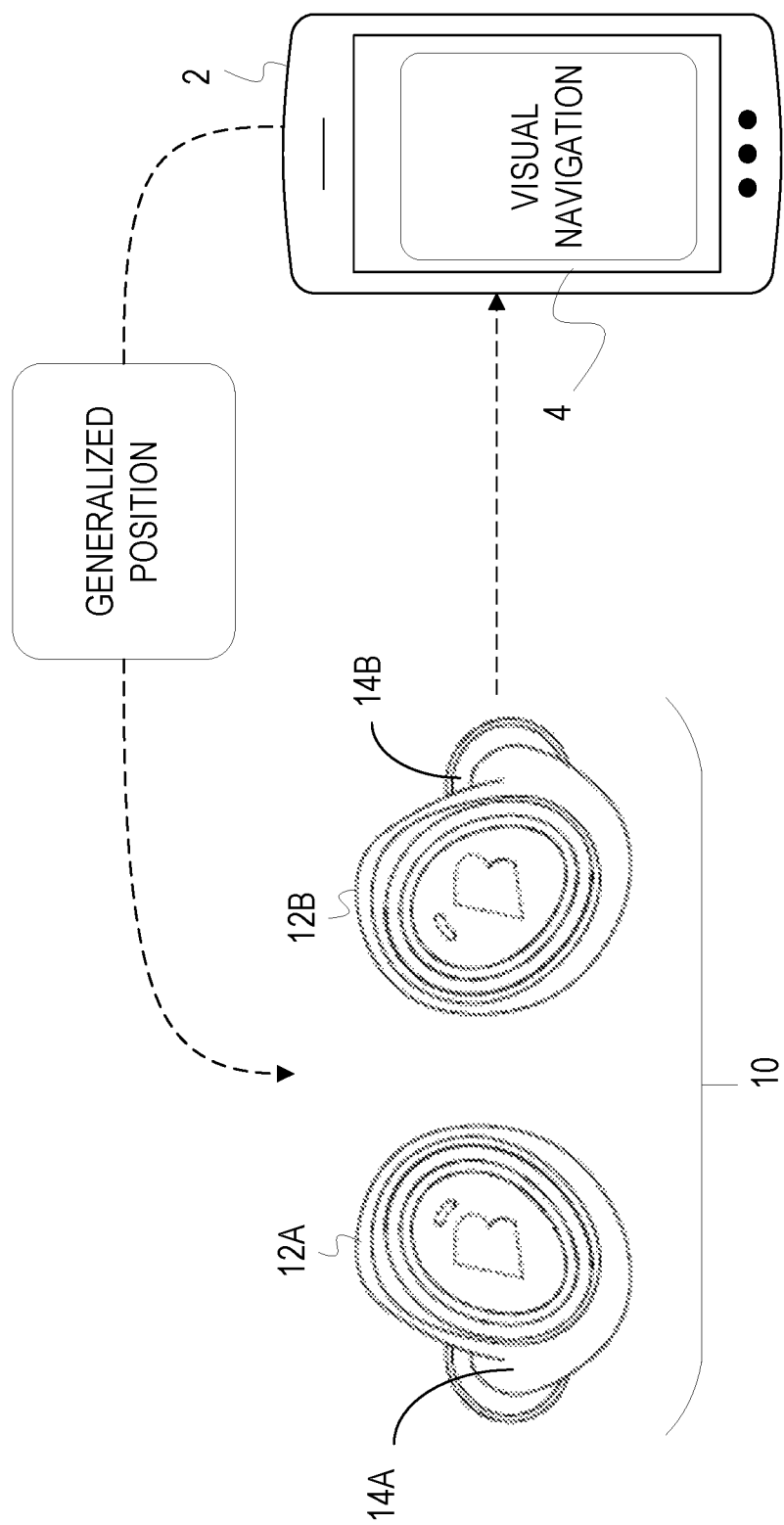
FIG. 1 illustrates a set of wireless earpieces configured to perform the methodology described herein.

FIG. 1 illustrates a set of binaural wireless earpieces 10 including a left earpiece 12A and a right earpiece 12B. The left earpiece 12A has a left earpiece housing 14A. The right ear piece 12B has a right earpiece housing 14B. A mobile device 2 which may be a mobile phone or other type of device has a screen display 4. The screen display 4 may be used for displaying visual navigation displays such as map interfaces. It is to be understood that the visual navigation may be used in combination with the binaural audio navigation described herein.

The mobile device 2 may include a Global Positioning System (GPS) receiver, a Global Navigation Satellite System (GLONASS) receiver or otherwise be configured to determine a generalized position of the user. Alternatively, the wireless earpieces may include a GPS receiver or other type of geolocation receiver.

The wireless earpieces 12A, 12B each include at least one inertial sensor 18A, 18B. The at least one inertial sensor 18A, 18B may, for example, be a 9-axis inertial sensor which includes a 3-axis gyroscope, a 3-axis accelerometer, and a 3-axis compass. The inertial sensors 18A, 18B allow for determining specific detailed data regarding the head orientation (such as may be determined by a gyroscope and/or magnetometer) and movement of the user (such as may be determined by an accelerometer). This data is fed as input into a dynamic binaural synthesis algorithm. A binaural synthesis algorithm may be used to provide for 3D sound synthesis through a model which includes virtual sound sources. Various methodologies may be used for binaural synthesis algorithms. See e.g. Head-Related Transfer Function and Virtual Auditory Display: Second Edition, Bosun Xian, J. Ross Publishing (2013), hereby incorporated by reference in its entirety. The virtual sound sources created by the binaural synthesis algorithm may include one or more main cues and one or more auditory landmark cues.

Binaural cues/virtual sources may be used to mark the next crossing/interaction point/destination. Such cues may be identified as main cues. Here a continuous audio cue is better suited than speech prompts. Because of their continuity they perceptibly recede in the background while always being discernible. In contrast speech prompts/discontinuous may cause a distraction to the user. Moreover, because dynamic binaural synthesis is used the position of the virtual cue is independent of the user's orientation. If the user is approaching the next crossing/interaction point/destination the source will be perceived as closer/louder.

To facilitate the orientation of the user, important landmarks will be 'displayed' as additional cues. For example, if a user is close to a river the sound of water may be 'displayed' at the location of the river. If a user is close to a church the sound of ringing bells may be 'displayed' at the position of the church. This functionality may be extended to display audio logos when passing well-known commercial establishments (e.g. Starbucks, McDonald's, etc.). User settings may be maintained so that preferences regarding which types of landmarks the user would like to use.

Various modes of operation may be used. In what may be considered a more "classic" mode, a user may input their destination. This input may be received various ways, it may be provided by physical input or speech input. Voice feedback may be given such as distance and duration for the user's mode or modes of travel. The route may include a first virtual source along the route that marks a first crossing or interaction point. The distance from the current location to the first virtual source may be stated in voice feedback. If the first crossing/interaction point is reached, the first virtual source disappears. The second virtual source may then appear and the distance stated and or estimated remaining time or estimated time of arrival or other voice feedback. This process may then be repeated until the destination is reached. At any time, in-between two crossing/interaction points a voice prompt may be triggered such as through physical input and/or speech input that states the remaining distance, the estimated remaining time, or other information related to progress.

In another mode of operation, a destination only mode, a continuous virtual source may be "displayed" at the position of the destination with no voice prompts. Alternatively, a continuous virtual source may be present at first crossing/interaction point and once that point is reached, that virtual source may disappear and the next continuous virtual source may appear, all without the need for voice prompts.

In addition to the virtual sources described other virtual sources may be used. For example, a continuous virtual source may be used which is indicative of a compass direction. Thus, for example, a virtual source may be used which is perceived as an infinite far away point associated with a magnetic north pole. Such a virtual source may be triggered on or off as desired by a user and provides the user with additional information that assists with their navigation.

Figure 2:
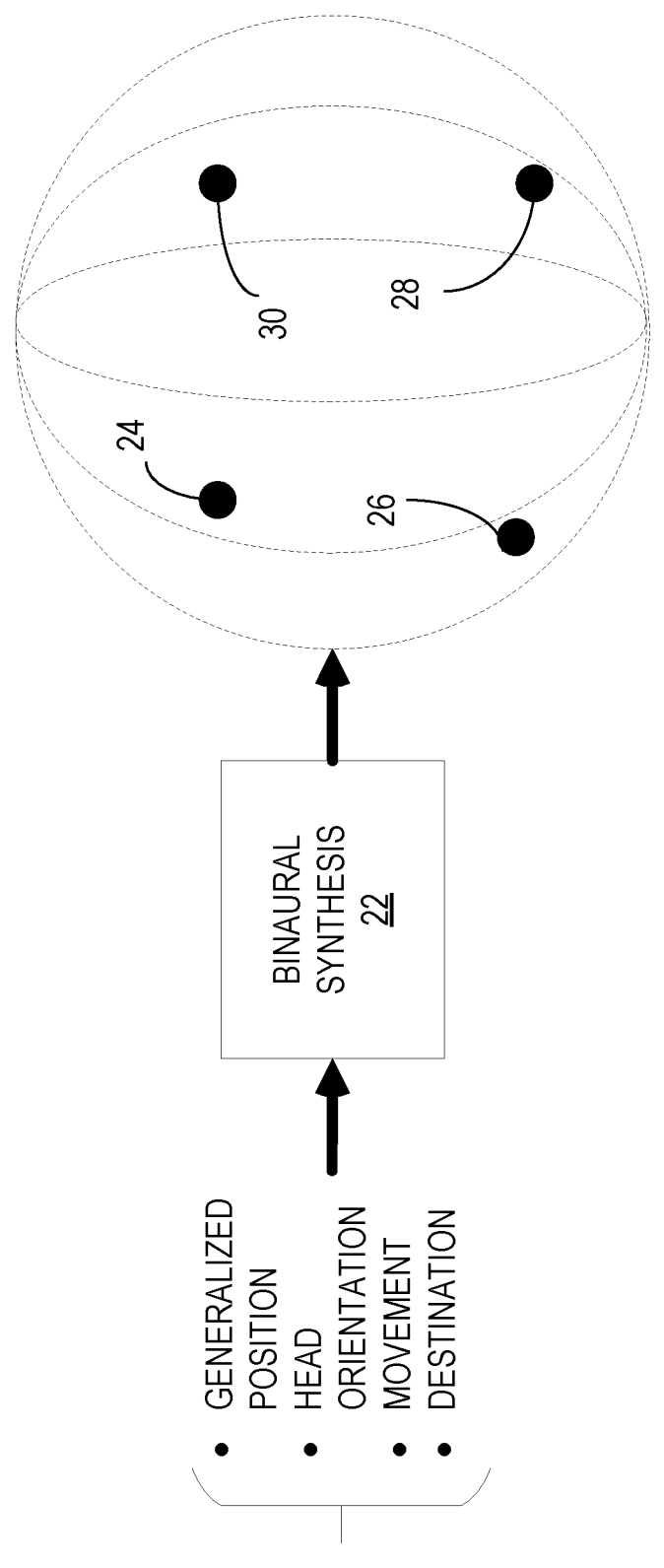
FIG. 2 illustrates a process of performing a binaural synthesis to define virtual sources.

FIG. 2 illustrates a method where input is received into a binaural synthesis algorithm 22. The binaural synthesis algorithm may be executed using a processor on one or both of the earpieces. Alternatively, the binaural synthesis algorithm may be executed using a processor on a mobile device in operatively communication with the earpieces or on a cloud computing platform in wireless communication with the earpieces either directly through a network or with the mobile device or other device which is in operative communication both with the earpieces and the cloud computing platform. Input 20 into the binaural synthesis algorithm 22 may include the generalized position, head orientation, movement, as well as the destination. The binaural synthesis algorithm 22 may create a plurality of virtual sound sources 24, 26, 28, 30. These virtual sound sources 24, 26, 28, 30 may include a main virtual sound source 30 which may be presented as a continuous audio cue. In addition, the virtual sound sources may include a plurality of auditory landmark cues 24, 26, 28. In addition, the virtual sound sources may include a compass virtual sound source.

Figure 3:
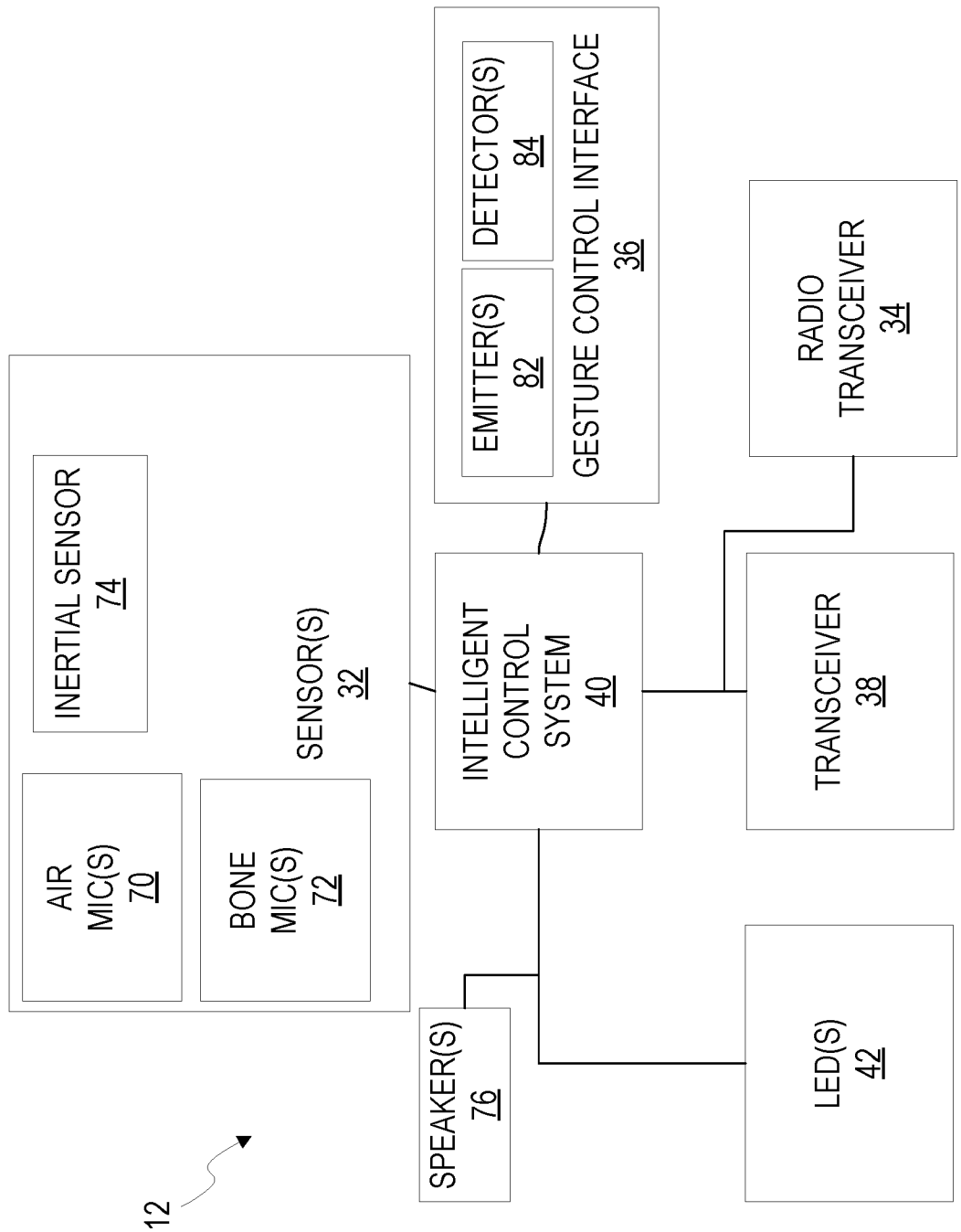
FIG. 3 is a block diagram of a wireless earpiece within the set of wireless earpieces.

FIG. 3 illustrates one example of a block diagram of a wireless earpiece 12. The wireless earpiece 12 may include a plurality of sensors 32 such as one or more air microphones 70, one or more bone conduction microphones 72, and one or more inertial sensors 74. Each of these sensors 32 may be operatively connected to an intelligent control system 40 which may include a processor used to implement a binaural synthesis algorithm. A gesture control interface 26 may be operatively connected to the intelligent control system 40 and provide one method of receiving user input. The gesture control interface 36 may include one or more emitters 82 and detectors 84 for generating an energy field and then observing changes in the energy field indicative of user input. Thus, for example, a user may perform taps, swipes, double taps, or other movements or gestures which may be interpreted as user input. One or more transceivers may be operatively connected to the intelligent control system 40. These may include a radio transceiver 34 which may be a BLE, Bluetooth, Wi-Fi, or other type of radio transceiver. The radio transceiver 34 may be used for wireless communicating with remote devices such as mobile devices or for a second earpiece within a set of earpieces. A transceiver 38 may be a near field magnetic induction transceiver which may be used to communicate with a second earpiece within a set of earpieces. It is contemplated that both earpieces within a set of earpieces need not include all of the same functionality. For example, only one need to include a radio transceiver 34 if the earpieces are linked through a transceiver 38. One or more LEDs 42 may be present and may be operatively connected to the intelligent control system 40 in order to provide visual feedback. One or more speakers 76 may be operatively connected to the intelligent control 40 in order to transduce audio messages or prompts and to produce the binaural audio when both a left earpiece and a right earpiece are used.

Therefore, various methods, systems, and apparatus have been shown and described. It is to be understood that various options and alternatives are contemplated as described herein, that features of different embodiments may be combined, and that the present invention is not to be limited to the specific embodiments shown.

What is claimed is:

1. A method for providing binaural audio navigation with a set of earpieces including a left earpiece and a right earpiece, the method comprising:
   obtaining a generalized position of a user of the set of the earpieces;
   obtaining a destination for the user of the set of the earpieces;
   sensing head orientation and head movement with inertial sensors of the set of earpieces;
   applying a binaural synthesis algorithm using the generalized position, the destination, the head orientation and the movement to create a plurality of virtual sound sources;
   transducing binaural audio based on the virtual sound sources at speakers within the set of the earpieces in order to provide binaural audio navigation to the user;
   wherein the plurality of virtual sound sources includes a main virtual sound source providing a continuous audio cue;
   wherein the plurality of virtual sources includes auditory landmark cues.

2. The method of claim 1 wherein the generalized position of the user of the set of the earpieces is a global positioning system (GPS) location.

3. The method of claim 1 wherein the applying the binaural synthesis algorithm is performed using a processor of at least one of the left earpiece and the right earpiece.

4. The method of claim 1 wherein the plurality of virtual sound sources further includes a continuous virtual source indicative of a compass direction.

5. The method of claim 4 wherein the compass direction is a magnetic north pole direction.

6. A method for providing binaural audio navigation with a set of earpieces including a left earpiece and a right earpiece, the method comprising steps of:
   obtaining a generalized position of a user of the set of the earpieces;
   obtaining a destination for the user of the set of the earpieces;
   sensing head orientation and head movement with inertial sensors of the set of earpieces;
   applying a binaural synthesis algorithm using the generalized position, the destination, the head orientation and the movement to create a plurality of virtual sound sources;
   transducing binaural audio based on the virtual sound sources at speakers within the set of the earpieces in order to provide binaural audio navigation to the user, wherein the plurality of virtual sound sources include a main virtual sound source providing a continuous audio cue; and
   determining that the user has arrived at the destination and turning off the main virtual sound source providing the continuous audio cue.

7. The method of claim 6 wherein the plurality of virtual sources includes auditory landmark cues.

8. The method of claim 7 further comprising providing a voice prompt indicative of the user arriving at the destination when the user has arrived at the destination.

9. The method of claim 8 further comprising changing the destination to a subsequent destination and repeating steps of claim 1.

10. A method for providing binaural audio navigation with a set of earpieces including a left earpiece and a right earpiece, the method comprising:
    obtaining a generalized position of a user of the set of the earpieces;
    obtaining a destination for the user of the set of the earpieces;
    sensing head orientation and head movement with inertial sensors of the set of earpieces;
    creating a plurality of virtual sound sources using the generalized position, the destination, the head orientation and the head movement;
    transducing binaural audio based on the virtual sound sources at speakers within the set of the earpieces in order to provide binaural audio navigation to the user;
    wherein the plurality of virtual sound sources includes a main virtual sound source providing a continuous audio cue;
    wherein the plurality of virtual sources includes auditory landmark cues.

* * * * *